United States Patent [19]

Bethke et al.

[11] Patent Number: 5,185,173
[45] Date of Patent: Feb. 9, 1993

[54] BREAD IMPROVER COMPOSITIONS

[75] Inventors: Rölf Bethke, Stuhr; Jochen Bode, Delmenhorst, both of Fed. Rep. of Germany

[73] Assignee: Van den Bergh Foods Co., Division of Conopco, Inc., New York, N.Y.

[21] Appl. No.: 592,084

[22] Filed: Oct. 3, 1990

[30] Foreign Application Priority Data

Oct. 6, 1989 [GB] United Kingdom ............... 8922592

[51] Int. Cl.⁵ .................... A21D 10/04; A23D 7/00
[52] U.S. Cl. .................... 426/549; 426/601; 426/653
[58] Field of Search ............ 426/99, 549, 601, 653

[56] References Cited

U.S. PATENT DOCUMENTS

| 2,521,242 | 9/1950 | Mitchell | 426/417 |
|---|---|---|---|
| 2,815,285 | 12/1957 | Holman et al. | 426/417 |
| 2,815,286 | 12/1957 | Andre et al. | 426/606 |
| 2,846,312 | 8/1958 | Lantz | 426/417 |
| 2,875,065 | 2/1959 | Thompson | 426/606 |
| 2,909,432 | 10/1959 | Linteris | 426/606 |
| 2,999,022 | 9/1961 | Payne et al. | 426/606 |
| 3,047,402 | 7/1962 | Schmidt | 426/606 |
| 3,395,023 | 7/1968 | Haighton et al. | 426/417 |
| 3,455,699 | 7/1969 | Bell et al. | 426/606 |
| 3,528,823 | 9/1970 | Rossen | 426/606 |
| 3,595,674 | 7/1971 | Shaffer et al. | 426/607 |
| 3,943,259 | 3/1976 | Norris | 426/24 |
| 4,234,606 | 11/1980 | Gawrilow | 426/24 |
| 4,359,482 | 11/1982 | Crosby | 426/606 |
| 4,889,740 | 12/1989 | Price | 426/606 |

FOREIGN PATENT DOCUMENTS 1025992 4/1966 United Kingdom .
1064335 4/1967 United Kingdom .
2208079 2/1989 United Kingdom .

Primary Examiner—Jeanette Hunter
Assistant Examiner—Mary S. Mims
Attorney, Agent, or Firm—Rimma Mitelman

[57] ABSTRACT

The invention is concerned with pumpable bread improver compositions comprising a liquid glyceride oil, in which solid fat particles are dispersed together with bread improver ingredients. The content of total solid particles of these compositions is at least 18 wt. %. The dispersed solid fat has a particle size of 0.01–0.05 mm and preferably has a melting point of at least 40° C. Processes for the preparation of these compositions are also described. In one process, all ingredients are mixed and milled together at a specific temperature so that the particle size of the solid components will be less than 0.05 mm. In another process, the small fat particles are made separately by spray-crystallisation and are mixed with the rest of the milled bread improver composition, optionally in the form of a dispersion in a liquid oil.

12 Claims, No Drawings

BREAD IMPROVER COMPOSITIONS

This invention relates to fat-based bread improver compositions suitable for inclusion in culinary mixes for baking, particularly for bread recipes.

Bread improver compositions include a variety of additives intended to improve the quality of bread and other bakers' goods, for example cake mixes, and for leavened and unleavened baked products generally. They include emulsifiers, enzymes, antioxidants, sugars, food acids and acidity regulators, milk solids and vitamins and may be accompanied by a proportion of flour to facilitate admixture with remaining bakery ingredients consisting largely of flour. Fats and/or liquid glyceride oils are also generally present. For ease of dispensing into the baking mix, quite a lot of sugar may be present, according to the recipe followed.

The convenience to the baker of including baking ingredients such as sugar in the additive composition, is offset by the consistency of the resultant composition, which is often a pasty mass difficult to distribute uniformly in the flour mix prepared by the baker. The present invention provides a pumpable bread improver composition which is readily dispersed with simple mixing equipment.

PRIOR ART

Bailey (Industrial Oil And Fat Products, 3rd Edition (1964), 313)) discloses that commercial fluid shortenings contain between 5 and 10% of fully hydrogenated fat in the $\beta$-crystalline form. U.S. Pat. No. 2,521,242 describes shortenings having a pumpable consistency and containing 16 to 60% fully hardened glycerides under conditions favouring the formation of $\beta$-crystals. In U.S. Pat. No. 2,815,286 shortenings containing 2 to 10% partial glycerides of saturated fatty acids are described which are pourable at 60° F. U.S. Pat. No. 2,846,312 discloses stirring plastic shortenings until a stable fluid is obtained. In U.S. Pat. No. 3,395,023 liquid shortenings are prepared by gradually cooling a mixture of fatty acid triglycerides to form a slurry which is then comminuted to provide a maximum particle size not more than 15 microns.

DE 3 816 978 describes a process (and product obtained according to this process) wherein a pumpable frying fat is made, in which process a dispersion of solid particles, mainly in the $\beta$-phase and having a particle size below 70 m, in a liquid oil is obtained by using a specific crystallisation procedure. The product of this process can also contain other solid ingredients, such as emulsifiers. However, the amount of total solid particles in the composition is always less than 18 wt. %. It is owing to this requirement that this product cannot be used as bread improver.

GENERAL DESCRIPTION OF THE INVENTION

Accordingly, the present invention provides a bread improver composition comprising a mixture of fat and bread improver ingredients, characterised in that the ingredients including solid fat particles are dispersed in a liquid glyceride oil in the form of a pumpable composition free from sedimentation, whereby the dispersion contains at least 18 wt. % of total solid particles. The liquid glyceride component of the composition according to the invention is liquid at 20° C. The fat particles are substantially solid at that temperature and preferably exhibit a solid content range including at least 40% solids at 20° C. The particle size of the fat particles is sufficiently small to prevent sedimentation and is preferably from 0.01 to 0.05 mm. The solid fat is preferably prepared by spray-crystallisation of the molten fat, sprayed into a chilled crystallisation zone. In this way, particles having a particle size of 0.5–1 mm can be obtained. However, it is also possible to make particles having a particle size of 0.01–0.05 mm by choosing the right spray conditions e.g. high pressure or the temperature. It is also possible to use a spray-dryer, wherein the fat and air are introduced simultaneously through different devices. The bigger particles are reduced in size, preferably by milling the dispersion of solid fat particles in the oil. The pumpable composition preferably contains 5 to 15 wt. % of the solid fat in the combined liquid glyceride oil and solid fat components. These components may be provided from the same or different fatty sources; for example, the solid fat may be a hard stearin fraction and the liquid oil an olein fraction of the same natural fatty source, or they may be from different sources.

The bread improver components of the present invention may be incorporated in the pumpable formulation by simply mixing before or after milling, but the proportions should remain within limits in which the pumpable nature of the formulation is retained. This means that, when the particle size of these components is too large, these components should be subjected to wet-milling as well. Bread improver components in solid form may be incorporated before or after milling as long as the pumpable consistency is retained. The solid components are preferably comminuted to a small size, preferably to a size of 0.05 or less, by wet-milling of a dispersion thereof in liquid fat.

The composition of the present invention remains pumpable over a temperature range from 10° C. to 25° C. without any significant change in viscosity and shows no sedimentation of undissolved components. It is easy to store and transport, can be accurately dispensed into baking ingredient mixtures and provides excellent baked products of notable uniformity.

A process for preparing a bread improver composition according to the invention comprises dispersing spray-crystallised fat particles in a liquid glyceride oil and milling the composition formed at a temperature at which the solid fat particles remain unmelted and are comminuted to a particle size of 0.05 mm or less. Any required bread improver components can be added either before or after milling. In the latter case, the solid fat particles should be small enough to resist sedimentation, preferably 0.05 mm or less. The amount of total solid particles in the composition should be at least 18 wt. %; however, the content of non-fat solids must not exceed a point beyond which pumpability is no longer possible.

Therefore, the pumpable bread improver composition can also be prepared by a process that comprises the following steps :
(1) Liquid oil and bread improver ingredients are mixed;
(2) This mixture is milled at a temperature at which later added solid fat particles remain unmelted;
(3) A compound containing solid fat particles (particle size below 0.05 mm), either as solid fat particles per se or as a dispersion in liquid oil, is added to the milled mixture of 2);
(4) The mixture of 3) is mixed at a temperature at which less than 10% of the solid fat particles will melt.

In the procedure, an amount of the solid particles is used in the process such that the total solid particle content of the pumpable composition is at least 18 wt. %.

Fat particles having a particle size of less than 0.05 mm can be obtained by spray-crystallising a melted fat at a temperature that is more than 60° C. below the melting point of the fat.

It is, however, preferred to disperse at least part of the bread improver components with the solid fat particles in the oil component and to mill the combined composition as before. It is particularly convenient to disperse any sugar to be included in the oil before milling, to ensure that this component is also comminuted sufficiently to avoid sedimentation.

Preferably, the composition is pre-chilled before milling to a temperature from 0° to −5° C., preferably more than 30° C. below the melting point of the solid fat and to ensure that the product temperature, after milling, is at most 40° C., preferably not more than 30° C. and simultaneously more than 30° C. below the melting point of the solid fat. Pre-chilling may be accomplished in a scraped-surface heat exchanger, e.g. a Votator A unit, rendering it in a chilled condition, which ensures that milling can be effected without melting the solid fat component. Milling to comminute the composition may be carried out, for example, in a ball-mill.

Preferably, the total fat and liquid glyceride oil comprises from 40% to 80%, the balance being bread improver components.

Suitable solid glyceride compositions exhibit the following ranges of solids :

From 10 to 20° C.: 6 to 15%;
25° C.: 5 to 14%;
30° C.: 4 to 13%;
35° C.: 3 to 10%.

Both the solid and liquid glyceride components may be provided from animal, marine and vegetable sources and may be fractionated and/or hardened by hydrogenation. Suitable vegetable oils include sunflower, soybean, rapeseed, corn, palm, cottonseed and groundnut oil. Animal fats include lard and tallow. Marine sources include whale, herring, sardine and menhaden oil.

EXAMPLES

A series of examples were prepared in which a dispersion in liquid glyceride oil of spray-chilled solid fat particles from 0.5–1 mm in size, emulsifier, sugar and bread improver additives was prepared at 30° C., chilled to within the range 0° to −5° C. in a Votator A unit and milled to a particle size less than 0.05 mm, the product after milling being within the temperature range 30°–40° C. and being of a pumpable consistency with no tendency to sedimentation. Further particulars appear in Table 1.

The oil was rapeseed oil (Rp) or soybean oil (SB). The fat was rapeseed oil hydrogenated to a slip melting point of 70° C. (Rp70) or palm oil hydrogenated to a slip melting point of 58° C. (PO58). The emulsifier was diacetyl tartaric ester of fatty acid glycerides (DATA), lecithin (Le) or monoglyceride (MG). Details of the other bread improver components appear in Table 2.

TABLE 1

| Ex | Hard fat | Oil | Wt. % Emulsifier | Sugar (ground) | Other Bread Improvers |
|---|---|---|---|---|---|
| 1 | 6 (Rp70) | 62 (Rp) | 7 (DATA Le) | 20 | 5 |
| 2 | 8 (PO58) | 58 (SB) | 6 (MG) | 16* | 12 |
| 3 | 5 (Rp70) | 45 (Rp) | 8 (DATA) | 25 | 15 |
| 4 | 5 (Rp70) | 50 (Rp) | 5 (MG) (DATA Le) | 30 | 10 |

*Dextrose/sucrose

TABLE 2

| EX | FLOUR | SUGAR | MILK SOLIDS | ENZYME | SALT ETC | ACID | OTHER |
|---|---|---|---|---|---|---|---|
| 1 | Malt | Sucrose | — | } | Ca-acetate | } | — |
| 2 | Soya | Sucrose/ Dextrose | Whey powder | } | CaCo3 | } | — |
| 3 | Malt | Sucrose | Non-fat Milk solids | } Carbohydrase | Cystein hydrochloride | } Ascorbic Acid | Guar gum |
| 4 | Soya | Sucrose | Non-fat Milk solids | } | } | } | — |

TABLE 3

| PRODUCT | WHEAT FLOUR (German-type) 550 | YEAST (Compressed) | SALT | WATER | PUMPABLE SHORTENING | EXAMPLE |
|---|---|---|---|---|---|---|
| LYE PRETZELS | 1000 | 30 | 20 | 490 | 50 | Ex. 1 |
| WHEAT BREAD (TOASTING) | 1000 | 50 | 20 | 530 | 50 | Ex. 2 |
| HARD CRUST ROLLS | 1000 | 40 | 20 | 550 | 30 | Ex. 3 |
| SWEETBREAD BUNS | 1000 | 70 | 15 | 400 | 150 | Ex. 4* |

*Plus 100 parts whole egg.

We claim:
1. A pumpable bread improver composition free from sedimentation, the composition comprising a dispersion of solid particles in a liquid glyceride oil wherein the solid particles include solid fat particles and solid bread improver ingredients including sugar and wherein the amount of total solid particles in the composition is greater than 18 wt. %.

2. A bread improver composition according to claim 1, in which the particle size of the dispersed fat is from 0.01 to 0.05 mm.

3. A bread improver composition according to claim 1 in which the melting point of the solid fat is at least 40° C.

4. A bread improver composition according to claim 1 in which the solids content at 20° C. of the solid fat is at least 40%.

5. A bread improver composition according to claim 1 in which the hard fat particles are spray-crystallised fat particles.

6. A bread improver composition according to claim 1 which contains 5% to 15% of solid fat by weight of the combined solid fat and liquid glyceride components.

7. A bread improver composition according to claim 1 in which the total solid and liquid glyceride components comprise from 40% to 80% by weight of the total composition, the balance being bread improver components.

8. The pumpable bread improver composition according to claim 1, wherein the amount of total solid particles in the composition is greater than about 18 wt. % and ranges up to 55 wt. %.

9. Process for the preparation of a pumpable bread improver composition as claimed in claim 1 which comprises the steps of:
 1. making a mixture of liquid oil and bread improver ingredients;
 2. milling this mixture at a temperature at which later added solid fat particles remain unmelted;
 3. adding to the milled mixture a compound containing solid fat particles, either a solid fat particles per se, or as a dispersion in liquid oil;
 4. mixing the mixture at a temperature at which less than 10% of the solid fat particles will melt.

10. Process according to claim 9, in which the particle size of the added, spray-crystallised fat particles is less than 0.05 mm, while an amount of the solid particles is incorporated in the process such that the total solid particle content of the pumpable bread improver is greater than 18 wt. %.

11. Process according to claim 9, in which spray-crystallised fat particles having a size of less than 0.05 mm are used that are obtained from a spray-crystallising process of melted fat, using a spray-crystallisation temperature that is more than 60° C. below the melting point of the fat.

12. Baked goods comprising a bread improver composition as claimed in claim 1.

* * * * *